3,314,012

PULSE CODE MODULATOR ENCODER SYSTEM

Yuichi Yoshida, Tokyo, Japan, assignor to Fujitsu Limited, Kawasaki, Japan, a corporation of Japan Filed May 27, 1963, Ser. No. 283,177
13 Claims. (Cl. 328—56)

My invention relates to a pulse code modulator encoder system particularly of the parallel type.

Pulse code modulation can be accomplished by various encoding systems such as feedback reduction systems, parallel systems and series system. Of these, the parallel system is most suitable for high speed modulation, but either requires special electronic code tubes, or, as in the case of parallel-type multi-frequency systems, the electronic elements must perform high repeating action, a further impediment to high speed coding.

It is an object of the present invention to avoid the above-mentioned difficulties of the parallel system and to produce a parallel code modulating system which can achieve high speed coding without using special electronic elements or tubes, while at the same time avoiding high repeating action by the electronic element.

Figure 1:
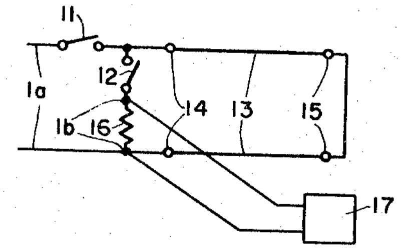

To this end and according to a feature of my invention, I apply a pulse to a transmission line and permit it to be reflected back and forth with at least one polarity inversion per cycle; after a time period corresponding to the magnitude to be encoded I absorb the reflected pulse and utilize its polarity as one bit, while at the same time similarly obtaining other bits in other transmission lines. The invention, its advantages and further objects thereof will be described and will become obvious from the following detailed description when taken with reference to the accompanying drawings, wherein:

FIG. 1 is a schematic diagram of an element according to the present invention.

Figure 2A:
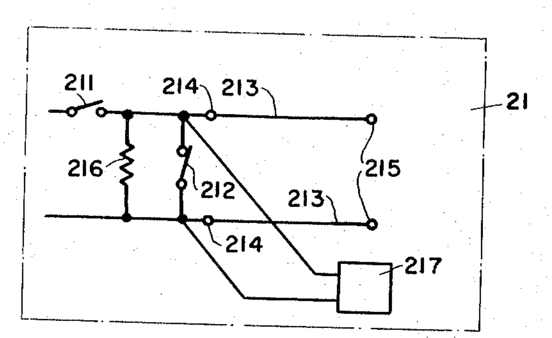
Figure 2B:
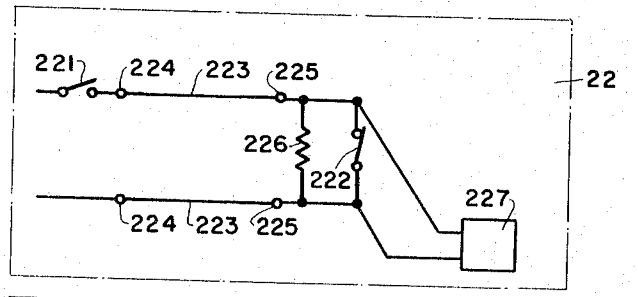
Figure 2C:
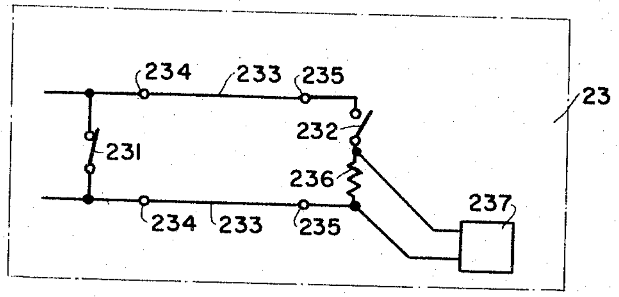

FIGS. 2*a*, 2*b* and 2*c* are further schematic diagrams of elements according to the present invention.

Figure 3:
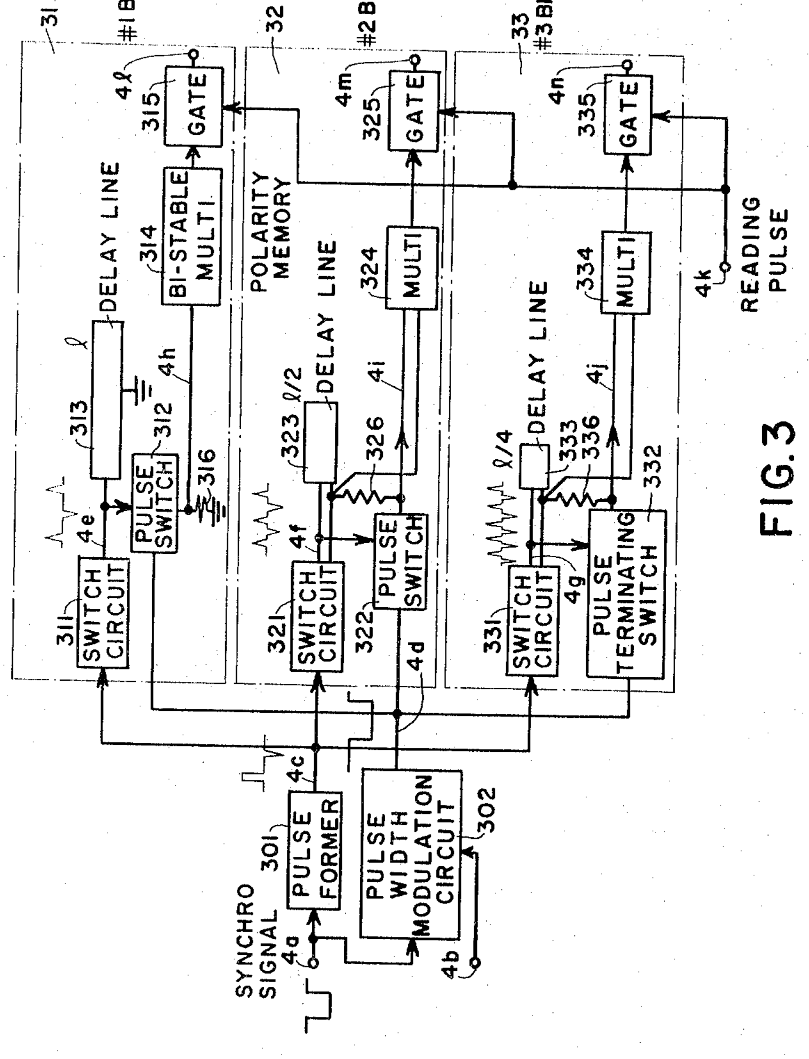

FIG. 3 is a block diagram of a modulating system for binary encoding.

Figure 4:
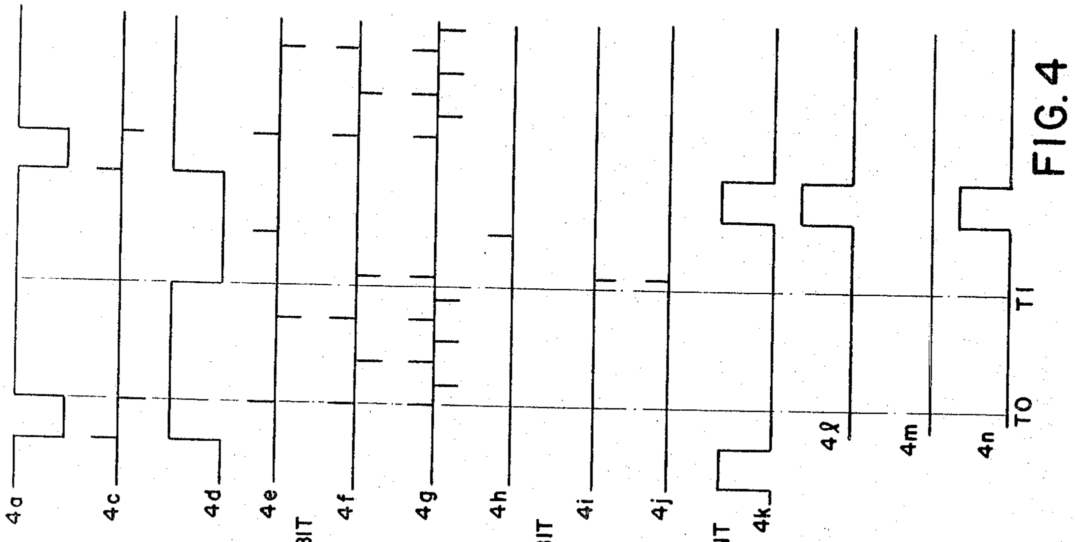

FIG. 4 constitutes time-voltage graphs 4*a* to 4*n* of the voltages occurring at various locations in the circuit of FIG. 3.

Figure 5:
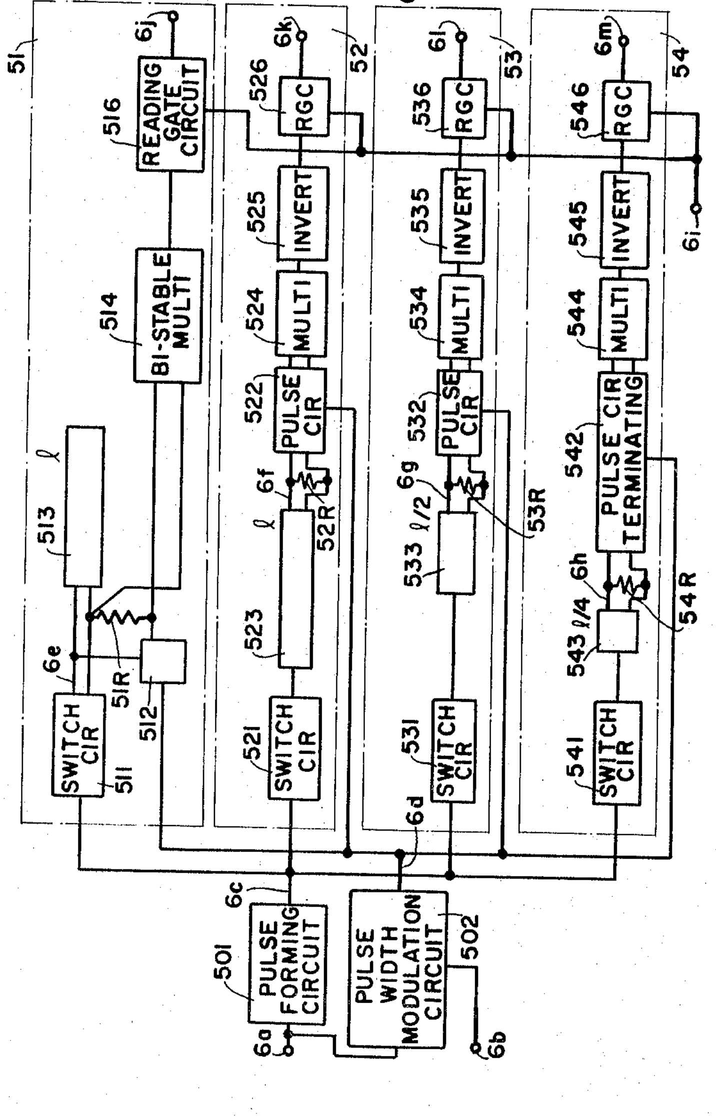

FIG. 5 is a block diagram of another modulator embodying features of the present invention.

Figure 6:
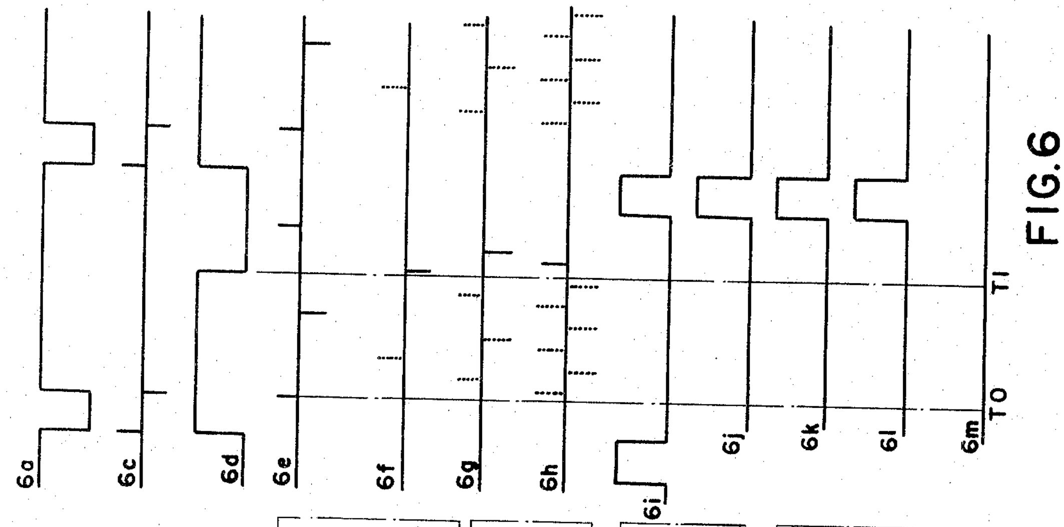

FIG. 6 constitutes time-voltage curves 6*a* to 6*m* of the voltages at various locations in the circuit of FIG. 5.

In FIG. 1 a bit coder for one particular bit of binary information is fed by input terminals 1*a*. A pulse input switch or pulse generation switch 11 passes the signal to a pair of pulse input terminals 14 across which are connected a pulse end or terminating switch 12 in series with an end or terminating resistance 16. A transmission line 13 extends from the pulse end terminal 14 to a pair of short circuited terminals 15 at the other end of the line. A pulse memory device 17 is connected across the resistor 16 at the terminals 1*b*. The resistance 16 has a value corresponding to the characteristic impedance of the line 13.

In operation, the switch 12 is first open and switch 11 closed. At a time TO at which coding proceeds, a pulse of narrower time width than the back and forth time delay of electrical signals in line 13 is introduced at the input terminals 1*a* to the line 13 through switch 11. Thereafter, switch 11 opens immediately. The supply pulse then proceeding down line 13 reverses in polarity upon reaching the short circuited terminals 15 and is reflected toward the pulse induction terminals 14. As long as switch 12 remains open, the pulses reaching terminals 14 reflect without change in polarity and again proceed toward terminals 15. Thus, the voltage wave form at terminals 14 constitutes alternating positive and negative pulse signals with mutual time spacings corresponding to the back and forth travel time in the line 13. If switch 12 is closed after an elapse of time from TO corresponding to the length of a pulse width modulated signal, the pulse appearing at terminals 14 after the closing of switch 12 will be absorbed by the resistance 16 and will not reflect again. The polarity of the pulse appearing at 16 after the closing of switch 12 is memorized by the pulse memory device 17. Therefore, the polarity of the memorized pulse may be indicative of whether the pulse has travelled back and forth in the line by an odd or even number of times.

The bit coder of FIG. 1 can be characterized as an open pulse input terminal type, because the switch 12 is open during pulse introduction or generation, and also as the pulse input terminal reading type because reading occurs at the pulse input terminals. The bit coder of FIG. 1 can be used for $n$ bits in conjuction with other bit coders (where $n$ is a positive integral number) to quantize a number of signals having a maximum pulse width $T_{max.}$ by first defining the length L of a line as $$L=vT_{max.}/4$$

where $v$ is the velocity of electric signal transmission in the line. The number of coders necessary is equal to $n$, and for any bit $i$ where $i \leqq n$, the length of the corresponding line equals $L/2^{i-1}$. If all the bit coders perform their operation simultaneously after a time TO up to a time $T_{max.}$, the memory content of each memory device may be read out to attain a coded value.

The circuits 21, 22 and 23 in FIGS. 2*a*, 2*b* and 2*c* are other bit coders corresponding in function to those of FIG. 1 and embodying features of the invention. In FIG. 2*a* the bit coder 21 is comprised of a transmission line 213 corresponding to the line 13, terminals 215 corresponding to the terminals 15, pulse input terminals 214 corresponding to the terminals 14, and a pulse generator switch 211 corresponding to the switch 11 in FIG. 1. However, in FIG. 2*a* the pulse termination switch 212 is connected directly across the terminals 214 in parallel with a similarly connected end resistor 216. The switch 211 is closed at the time of pulse introduction TO whereas switch 212 is opened; immediately thereafter the switch 211 is opened and the switch 212 is closed. The pulse can move back and forth in the line reversing each time at the terminals 214. After the time T1, the switch 212 is opened rendering end resistance 216 effective in the terminals 214 so as to absorb the pulse and terminate pulse travel through the line. The pulse memory device 217 then memorizes the polarity so as to indicate quantum for one bit. Thus, the bit coder in FIG. 2*a* may be characterized as a short-circuit pulse input terminal type due to the operation of switch 212, and also as a pulse input terminal reading type because a pulse memory device 217 is connected across the pulse induction terminals 214.

In FIGS. 2*b* and 2*c* the bit coders 22 and 23 include respective lines 223 and 233, pulse input terminals 224 and 234, pulse reflection terminals 225 and 235, each corresponding respectively to the line 13, the terminals 14 and the terminals 15 in FIG. 1. In FIG. 2*b* the bit coder 22 possesses an input switch 221 corresponding to the pulse generation switch 11 in FIG. 1, but the pulse termination switch 22 and the pulse termination resistor 226 are connected in parallel across the terminals 225 at the other end of the line to which the pulse width modulated pulse is applied. A pulse memory device 227 is connected across the termination resistor 226. In operation, with switch 222 closed, the switch 221 of pulse coder 22 closes momentarily for the pulse to enter terminals 224 and pass back and forth through the line 223 with polarity reversal at the terminals 225 due to the closed switch 222. At time T1, the switch 222 opens so that the pulses are absorbed by resistor 226 and stored in pulse memory device 227. The bit coder 22 can be characterized as the open pulse input terminal type, as the pulse receiving terminal reading type, and the pulse reading short-circuit type.

The bit coder 23 of FIG. 2*a* operates when the switch 231 is opened at time TO to permit a pulse to be applied to terminals 234 with the switch 232 open. After pulse application the switch 231 closes and the pulse travels back and forth through the line with pulse reversal at the terminals 234 until the time T1 when the switch 232 closes, resulting in absorption of the pulse by the resistor 236 and memory of its polarity by the pulse memory device 237. The pulse coder 23 may be characterized as a short-circuit pulse input terminal type, pulse receiving terminal reading type and pulse reading open type. Pulse receiving terminal reading types of bit coders are used for delaying the pulse reading time by half of the periodical quantum measure.

The manner in which the bit coders of FIGS. 1 and 2 can be combined for operation, and the control of the switches in the individual bit coders is illustrated in the example of a binary coding system for a three-bit code according to the invention shown in FIG. 3. FIG. 4 illustrates by time-voltage curves 4*a* to 4*n* the voltages appearing at locations in the circuit of FIG. 3 designated by corresponding reference numerals.

The circuit in FIG. 3 is composed of three bit coders 31, 32 and 33 of the pulse input terminal reading type and open pulse input terminal type. The coders 31, 32 and 33 encode the first, second and third bits respectively. A cable-reflection pulse-forming circuit 301 forms a square-wave input synchronizing signal 4*a* into sharp pulses 4*c* at its leading and trailing edges and applies it to switching circuits 311, 321 and 331. The switching circuits 311, 321, 331 generate pulses only during the pulse corresponding to the trailing edge of the synchronizing signal 4*a*. The outputs of the switching circuits 311, 321 and 331 correspond to the first pulses in curves 4*e*, 4*f* and 4*g* and define the starting time TO. Simultaneously, a pulse width modulation circuit 302, receiving a quantum value 4*b* (not shown in FIG. 4) and the synchronizing signal 4*a*, generates a pulse 4*d* having a width corresponding to the quantum value and applies this signal to respective pulse termination switch circuits 312, 322 and 332. The switch circuits 312, 322 and 332 constitute bi-directional gates corresponding to the switch 12 in FIG. 1, and are connected in series with respective resistors 316, 326, 336 corresponding to resistor 16. The gates 312, 322, 332 are connected with the corresponding resistors 316, 326, 336 in series, and across the respective outputs of the switching circuits 311, 321, 331 and the respective inputs of transmission lines 313, 323, 333. The values of resistors 316, 326, 336 are equal respectively to the characteristic impedances of the lines 313, 323, 333. The gates 312, 322, 332 open at TO and close in response to the output of the pulse width modulation circuit 302. The length of lines 313, 323 and 333 are respectively L, L/2 and L/4.

Applying pulses from the switching circuits 311, 321, 331 to the transmission lines 313, 323 and 333 produces at the respective pulse input terminals the pulse wave forms shown in curves 4*e*, 4*f* and 4*g*. However, the output signal 4*d* of pulse width modulation circuit 302 renders the pulse termination switches 312, 322, 332 conductive after a pulse width modulation time T1 which is proportional to the elapse of the modulated time signal 4*d* from the time TO. After the time T1, the next pulse in each line passes through the termination circuits 312, 322, 332, respectively, as shown by curves 4*h*, 4*i* and 4*j* of FIG. 4. to respective bistable multivibrators 314, 324 and 334 which memorize the respective polarities. A reading pulse 4*k* reads out the contents of these memories through reading gates 315, 325 and 335 so that the pulses then constitute the parallel pulse code modulation outputs 4*l*, 4*m* and 4*n*.

FIG. 5 is an encoder system according to the invention for four bit Gray code. The time voltage curves 6*a* to 6*m*, of FIG. 6, indicate the waveforms at correspondingly designated points in the circuit diagram of FIG. 5. Characterizing the Gray code is the fact that the quantum measure of each bit in the usual binary code is slipped by half of its quantum with respect to a predetermined level of the coded signal and the first bit of the usual binary code is applied as the first bit of the Gray code. Thus, FIG. 5 includes four bit coders 51, 52, 53, 54 for bits Nos. 1, 2, 3 and 4 respectively, bit coder 51 corresponding to the bit coder 31 of FIG. 3 and bit coders 52, 53, 54 corresponding to bit coder 22 of FIG. 2. In this manner, by use of open pulse induction terminals and reading pulse receiving terminal, the periodical quantum measure is slipped by half. Each of the bit coders comprises a corresponding one of transmission lines 513, 523, 533 and 543 having respective lengths L, L, L/2 and L/4. Four respective switching circuits 511, 521, 531, 541 correspond to the switching circuit 311 in FIG. 3 and pass a pulse formed at the trailing edge of a synchronizing wave form 6*a* by means of the pulse-forming circuit 501 to the transmission lines 513, 523, 533 and 543. Pulse width modulation circuit 502 issuing pulses 6*d*, bistable multivibrators 514, 524, 534, 544, reading gate circuits 516, 526, 536 and 546, and pulse termination circuit 512 are the same as the corresponding circuits of FIG. 3. three pulse termination circuits 522, 532 and 542 constitute bi-directional gate circuits connected parallel to three respective resistors 52R, 53R, 54R across the ends of respective transmission lines 523, 533 and 543, said respective resistors having values corresponding to the characteristic impedances of their lines.

An input signal 6*a* applied to the pulse-forming circuit 501 is transformed to at its trailing edge to a single pulse (constituting the index for the time TO) to form in the switch circuits 511, 521, 531 and 541 the initial pulses shown in curves 6*e*, 6*f*, 6*g* and 6*h* of FIG. 6. These pulses are applied to transmission lines 513, 523, 533 and 543. Simultaneously, the pulse width modulation circuit 502 generates a pulse having the width shown in curve 6*d* of FIG. 6 and representing a value to be coded, to open pulse termination circuit 512, and to close the pulse termination circuits 522, 532, 542. At the end of the pulse 6*d*, the pulse termination circuit 512 is closed and the pulse termination circuits 522, 532 and 542 are opened. Then, all four transmission lines are terminated by the respective resistors 51R, 52R, 53R and 54R, which absorb the last reflected pulses. The polarities of these pulses are memorized in the bistable multivibrators 514, 524, 534 and 544, respectively. The state of the bistable multivibrator 514 is read by the reading gate circuit 516 as a result of a signal 6*i* applied thereto to produce an output signal 6*j*. The remaining bistable multivibrators are read at the same time by the reading gate circuits 526, 536 and 546, but only after inversion. The output signals of the three reading gate circuits 526, 536, 546 are shown as curves 6*k*, 6*l* and 6*m* of FIG. 6.

While detailed embodiments of the invention have been shown, it will be obvious to those skilled in the art that the invention may be otherwise embodied.

I claim:

1. A bit coder, comprising reflecting a transmission line having a set of input terminals and a set of end terminals, momentarily operable switch means connected to said input terminals for permitting pulses to enter and reflect back and forth in said transmission line, and circuit means for short-circuiting one set of said terminals to cause polarity reversal of a pulse in said transmission line and for responding to an input quantum value to suppress reflections and read out the polarity of a pulse in said transmission line, said circuit means including pulse end resistance means, pulse terminating switch means adapted to respond to the quantum value of a signal for connecting said pulse end resistance means to one set of terminals so as to absorb the pulse in said transmission line, and memory means connected across said pulse end resistance means for memorizing the polarity of the pulse.

2. A bit coder, comprising reflecting a transmission line having a set of input terminals and a set of end terminals, momentarily operable switch means connected to said input terminals for permitting pulses to enter and reflect back and forth in said transmission line, and circuit means for short-circuiting one set of said terminals to cause polarity reversal of a pulse in said transmission line and for responding to an input quantum value to suppress reflections and read out the polarity of a pulse in said transmission line, said circuit means including pulse end resistance means, pulse terminating switch means connected in series with said pulse end resistance means and adapted to respond to the quantum value of a signal for connecting said pulse end resistance means across one set of terminals so as to absorb the pulse in said transmission line, and memory means connected across said pulse end resistance means for memorizing the polarity of the pulse.

3. A bit coder, comprising reflecting a transmission line having a set of input terminals and a set of end terminals, momentarily operable switch means connected to said input terminals for permitting pulses to enter and reflect back and forth in said transmission line, and circuit means for short-circuiting one set of said terminals to cause polarity reversal of a pulse in said transmission line and for responding to an input quantum value to suppress reflections and read out the polarity of a pulse in said transmission line, said circuit means including pulse end resistance means, pulse terminating switch means connected in series with said pulse end resistance means and adapted to respond to the quantum value of a signal for connecting said pulse end resistance means across said input terminals so as to absorb the pulse in said transmission line, a circuit short-circuiting said end terminals, and memory means connected across said pulse end resistance means for memorizing the polarity of the pulse.

4. A bit coder, comprising reflecting a transmission line having a set of input terminals and a set of end terminals, momentarily operable switch means connected to said input terminals for permitting pulses to enter and reflect back and forth in said transmission line, and circuit means for short-circuiting one set of said terminals to cause polarity reversal of a pulse in said transmission line and for responding to an input quantum value to suppress reflections and read out the polarity of a pulse in said transmission line, said circuit means including pulse end resistance means, pulse terminating switch means connected in series with said pulse end resistance means and adapted to respond to the quantum value of a signal for connecting said pulse end resistance means across said end terminals so as to absorb the pulse in said transmission line, said input terminals being short-circuited during back and forth reflection by said momentarily operable switch means, and memory means connected across said pulse end resistance means for memorizing the polarity of the pulse.

5. A bit coder, comprising reflecting a transmission line having a set of input terminals and a set of end terminals, momentarily operable switch means connected to said input terminals for permitting pulses to enter and reflect back and forth in said transmission line, and circuit means for short-circulating one set of said terminals to cause polarity reversal of a pulse in said transmission line and for responding to an input quantum value to suppress reflections and read out the polarity of a pulse in said transmission line, said circuit means including pulse end resistance means, pulse terminating switch means connected parallel to said pulse end resistance means and adapted to respond to the quantum value of a signal to open and connect said pulse end resistance means across one set of terminals so as to absorb the pulse in said transmission line, and memory means connected across said pulse end resistance means for memorizing the polarity of the pulse.

6. A bit coder, comprising reflecting a transmission line having a set of input terminals and a set of end terminals, momentarily operable switch means connected to said input terminals for permitting pulses to enter and reflect back and forth in said transmission line, and circuit means for short-circuiting one set of said terminals to cause polarity reversal of a pulse in said transmission line and for responding to an input quantum value to suppress reflections and read out the polarity of a pulse in said transmission line, said circuit means including pulse end resistance means, pulse terminating switch means connected parallel to said pulse end resistance means and adapted to respond to the quantum value of a signal to open and connect said pulse end resistance means across said input terminals so as to absorb the pulse in said transmission line, and memory means connected across said pulse end resistance means for memorizing the polarity of the pulse.

7. A bit coder, comprising reflecting a transmission line having a set of input terminals and a set of end terminals, momentarily operable switch means connected to said input terminals for permitting pulses to enter and reflect back and forth in said transmission line, and circuit means for short-circuiting one set of said terminals to cause polarity reversal of a pulse in said transmission line and for responding to an input quantum value to suppress reflections and read out the polarity of a pulse in said transmission line, said circuit means including pulse end resistance means, pulse terminating switch means connected parallel to said pulse end resistance means and adapted to respond to the quantum value of a signal to open and connect said pulse end resistance means across said end terminals so as to absorb the pulse in said transmission line, and memory means connected across said pulse end resistance means for memorizing the polarity of the pulse.

8. A pulse code modulation encoder, comprising a plurality of switching means having pulse repetition rates related in geometric order, signal means for initiating pulse generation in each of said switching means, pulse modulation means for producing pulses having a pulse width corresponding to the value to be encoded, said pulse modulation means being synchronized with said signal means, a plurality of gate means connected to said switching means and to said pulse modulation means for responding to said switching means only after cessation of the modulated pulse from said pulse modulation means, said gate means having means for suppressing the output of said switching means after the first pulse in each switching means occurring subsequent to the cessation of the modulated pulse of said pulse modulation means, and means for reading the polarity of the pulses passed by said gate means.

9. A pulse-code modulator, comprising a plurality of switching means each having pulse outputs of alternating sequence and having respective repetition rates related in geometric order, signal means for initiating pulse generation in each of said switching means, and pulse reading means responding to a predetermined quantum value for reading the polarity of pulses emitted by the respective switching means subsequent to a moment determined by the quantum value.

10. A pulse-code modulator, comprising a plurality of reflecting transmission lines each having a set of input terminals and a set of end terminals, signal means for initiating pulse reflections in each of said transmission lines simultaneously, gate circuit means connected to each of said transmission lines for short-circuitng one set of said terminals in each of said transmission lines to cause polarity reversal of a pulse in said transmission line and for responding to an input quantum value to read out the polarity of a pulse in each of said transmission lines, said circuit means including pulse end resistance means for each of said transmission lines, pulse terminating switch means for each of said transmission lines adapted to respond to the input quantum value for connecting each pulse end resistance means to one set of terminals in each of said transmission lines so as to absorb the pulse in each of said transmission lines, and a plurality of memory means each connected across one of said pulse end resistance means for memorizing the polarities of the pulses.

11. A pulse-code modulator, comprising a plurality of reflecting transmission lines each having a set of input terminals and a set of end terminals, signal means for initiating pulse reflections in each of said transmission lines simultaneously, gate circuit means connected to each of said transmission lines for short-circuiting one set of said terminals in each of said transmission lines to cause polarity reversal of a pulse in said transmission line and for responding to an input quantum value to read out the polarity of a pulse in each of said transmission lines, said circuit means including pulse end resistance means for each of said transmission lines, pulse terminating switch means for each of said transmission lines adapted to respond to the input quantum value for connecting each pulse end resistance means to one set of terminals in each of said transmission lines so as to absorb the pulse in each of said transmission lines, and a plurality of memory means each connected across one of said pulse end resistance means for memorizing the polarities of the pulses, said transmission lines being related in length in geometric order.

12. A pulse-code modulator, comprising a plurality of reflecting transmission lines each having a set of input terminals and a set of end terminals, signal means for initiating pulse reflections in each of said transmission lines simultaneously, gate circuit means connected to each of said transmission lines for sort-circuiting one set of said terminals in each of said transmission lines to cause polarity reversal of a pulse in said transmission line and for responding to an input quantum value to read out the polarity of a pulse in each of said transmission lines, said circuit means including pulse end resistance means for each of said transmission lines, pulse terminating switch means for each of said transmission lines adapted to respond to the input quantum value for connecting each pulse end resistance means to one set of terminals in each of said transmission lines so as to absorb the pulse in each of said transmission lines, and a plurality of memory means each connected across one of said pulse end resistance means for memorizing the polarities of the pulses, said transmission lines being related in length in geometric order, the pulse terminating switch means of each of said transmission lines being connected in series with the corresponding pulse end resistance means and across the corresponding input terminals, said end terminals being short-circuited.

13. A pulse-code modulator, comprising a plurality of reflecting transmission lines each having a set of input terminals and a set of end terminals, signal means for initiating pulse reflections in each of said transmission lines simultaneously, gate circuit means connected to each of said transmission lines for short-circuiting one set of said terminals in each of said transmission lines to cause polarity reversal of a pulse in said transmission line and for responding to an input quantum value to read out the polarity of a pulse in each of said transmission lines, said circuit means including pulse end resistance means for each of said transmission lines, pulse terminating switch means for each of said transmission lines adapted to respond to the input quantum value for connecting each pulse end resistance means to one set of terminals in each of said transmission lines so as to absorb the pulse in each of said transmission lines, and a plurality of memory means each connected across one of said pulse end resistance means for memorizing the polarities of the pulses, one of said transmission lines being the same length as another of said transmission lines, the pulse terminating switch means of one of said transmission lines being connected in series with the corresponding pulse end resistance means and across the corresponding input terminals and the switch means of the other of said transmission lines being connected parallel to the corresponding pulse end resistance means and across the corresponding input terminals, and reversing means connected to the memory means of the last-mentioned transmission line.

References Cited by the Examiner

UNITED STATES PATENTS 2,894,153 7/1959 Glomb ------------- 307—106

ARTHUR GAUSS, *Primary Examiner.*

J. ZAZWORSKY, *Assistant Examiner.*